(12) United States Patent
Kray et al.

(10) Patent No.: US 12,123,321 B2
(45) Date of Patent: Oct. 22, 2024

(54) COMPOSITE AIRFOIL ASSEMBLY HAVING A DOVETAIL PORTION

(71) Applicant: GENERAL ELECTRIC COMPANY, Schenectady, NY (US)

(72) Inventors: Nicholas Joseph Kray, Mason, OH (US); Michael John Franks, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/088,990

(22) Filed: Dec. 27, 2022

(65) Prior Publication Data

US 2024/0209742 A1 Jun. 27, 2024

(51) Int. Cl.
*F01D 5/28* (2006.01)
*F01D 5/14* (2006.01)
*F01D 5/30* (2006.01)

(52) U.S. Cl.
CPC .............. *F01D 5/282* (2013.01); *F01D 5/147* (2013.01); *F01D 5/30* (2013.01); *F05D 2300/6034* (2013.01)

(58) Field of Classification Search
CPC ...... F01D 5/282; F01D 5/3092; F01D 5/3007; F01D 5/147; F01D 5/3084; F01D 5/284; F01D 5/28; F01D 5/288; F01D 11/008; F01D 5/22; F01D 11/006; F01D 5/028; F01D 9/041; F01D 25/005; F01D 5/025; F01D 5/30; F01D 5/3023; F01D 5/34; F01D 7/00; F05D 2220/36; F05D 2300/603; F05D 2300/6033; F05D 2300/6034; F05D 2220/32; F05D 2300/6012; F05D 2230/60; F05D 2240/80; F05D 2300/614; F05D 2230/23; F05D 2230/31; F05D 2240/30; F05D 2300/10; F05D 2300/6032; F05D 2230/53; F05D 2240/24; F05D 2240/306; F05D 2240/305; F05D 2250/70; F05D 2300/702; F04D 29/324; F04D 29/325; F04D 29/322; F04D 29/34
See application file for complete search history.

(56) References Cited

U.S. PATENT DOCUMENTS

| | | | | |
|---|---|---|---|---|
| 3,752,600 A | * | 8/1973 | Walsh | F01D 5/282 415/217.1 |
| 5,375,978 A | * | 12/1994 | Evans | B64C 11/26 416/241 A |
| 5,573,377 A | | 11/1996 | Bond et al. | |
| 6,290,466 B1 | | 9/2001 | Ravenhall et al. | |

(Continued)

FOREIGN PATENT DOCUMENTS

FR 3049305 A1 9/2017

OTHER PUBLICATIONS

Machine Translation of FR3049305 A1 [retrieved on Mar. 21, 2024]. Retrieved from: Espacenet. (Year: 2024).*

*Primary Examiner* — Eric J Zamora Alvarez
(74) *Attorney, Agent, or Firm* — McGarry Bair PC

(57) ABSTRACT

A composite blade assembly for a turbine engine, the composite blade assembly having a core and a laminate skin. The core having a composite structure. The laminate skin having at least one composite ply. The laminate skin having a first portion forming a first angle relative to a horizontal plane, and a second portion forming a second angle relative to the horizontal plane.

20 Claims, 3 Drawing Sheets

(56) References Cited

U.S. PATENT DOCUMENTS

| | | | |
|---|---|---|---|
| 8,105,042 B2 | 1/2012 | Parkin et al. | |
| 8,123,463 B2 * | 2/2012 | Kray | F01D 5/282 |
| | | | 29/889.6 |
| 8,419,374 B2 | 4/2013 | Huth et al. | |
| 8,573,947 B2 | 11/2013 | Klinetob et al. | |
| 8,696,319 B2 | 4/2014 | Naik | |
| 9,422,819 B2 * | 8/2016 | Drozdenko | F01D 5/3007 |
| 9,488,059 B2 * | 11/2016 | Ventura | F01D 5/282 |
| 9,828,864 B2 | 11/2017 | Whitehurst et al. | |
| 10,041,354 B2 * | 8/2018 | Kray | F01D 5/147 |
| 10,570,755 B2 * | 2/2020 | Billings | F01D 5/3007 |
| 11,346,363 B2 | 5/2022 | Foster et al. | |
| 11,428,105 B2 | 8/2022 | Welch | |
| 2014/0154073 A1 | 6/2014 | Cairo | |
| 2016/0160658 A1 * | 6/2016 | McCaffrey | F01D 5/282 |
| | | | 29/889.71 |
| 2016/0222800 A1 * | 8/2016 | Kleinow | F01D 5/282 |
| 2021/0246791 A1 * | 8/2021 | McCaffrey | F01D 5/3084 |

* cited by examiner

COMPOSITE AIRFOIL ASSEMBLY HAVING A DOVETAIL PORTION

TECHNICAL FIELD

The disclosure generally relates to a composite airfoil assembly having a dovetail portion, and more specifically to a composite airfoil assembly having the dovetail portion within a turbine engine.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blade and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotation sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
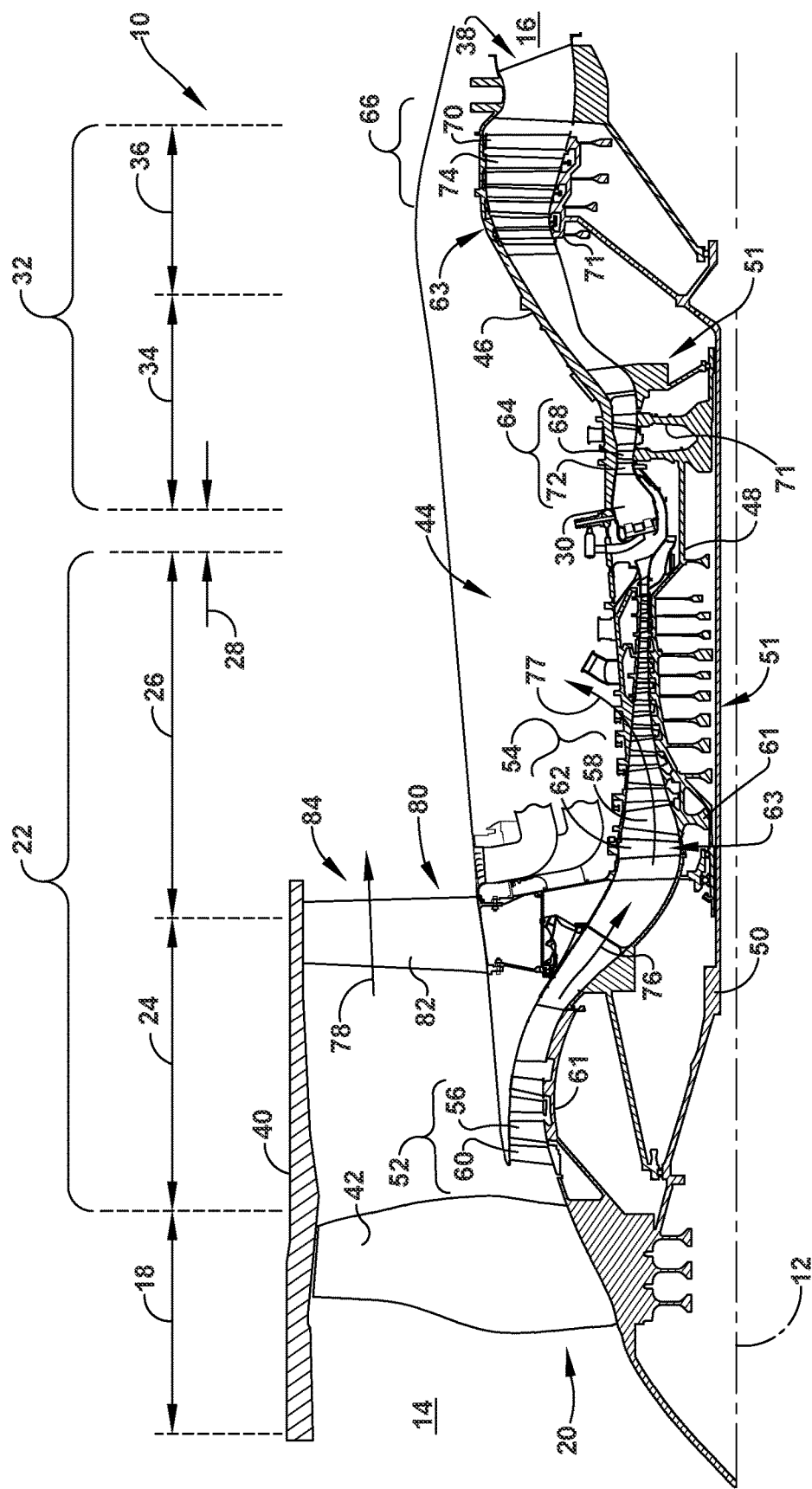
FIG. 1 is a schematic cross-sectional view of a turbine engine in accordance with an exemplary embodiment of the present disclosure.

Aspects of the disclosure herein are directed to a turbine engine including a composite airfoil assembly including a dovetail portion and an airfoil portion. The composite airfoil can be used at one or more locations within the turbine engine. For example, the composite airfoil assembly is very suitable as a fan blade in a fan section of a turbine engine. Although other locations, such as the compressor section and turbine section are contemplated. The composite airfoil assembly can be mounted in a variety of ways. One such mounting is securing the blades to a spinner of the fan section, directly, or via a pitch control assembly. Wherever the composite airfoil assembly is located, one suitable mounting is a disk assembly that has complementary sockets to receive the dovetail portion, with the sockets circumferentially spaced about the periphery of the disk assembly. The composite airfoil assembly and disk assembly can collectively form a rotating assembly such that the composite airfoil assembly is a composite blade assembly.

The composite airfoil assembly includes a core and a laminate skin. The composite airfoil assembly is designed to withstand high mechanical stresses associated with the operation of the turbine engine. For purposes of illustration, the present disclosure will be described with respect to a composite airfoil assembly for a turbine engine, specifically a composite airfoil assembly provided within a fan section of the turbine engine. It will be understood, however, that aspects of the disclosure described herein are not so limited and can have general applicability within other engines or within other portions of the turbine engine. For example, the disclosure can have applicability for a composite airfoil assembly in other engines or vehicles, and can be used to provide benefits in industrial, commercial, and residential applications. Further, aspects of this disclosure will be directed towards a composite blade assembly including a dovetail portion. It will be appreciated that aspects this disclosure are directed towards any composite airfoil assembly having a dovetail portion including, but not limited to, a composite blade assembly or a composite vane assembly.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine wherein at least a portion of the gas turbine engine is exposed to such as, but not limited to, combustion gases, ambient air, pressurized airflow, working airflow, or any combination thereof. It is yet further contemplated that the gas turbine engine can be other suitable turbine engines such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The terms "metallic" as used herein are indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of the airflow 78 bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
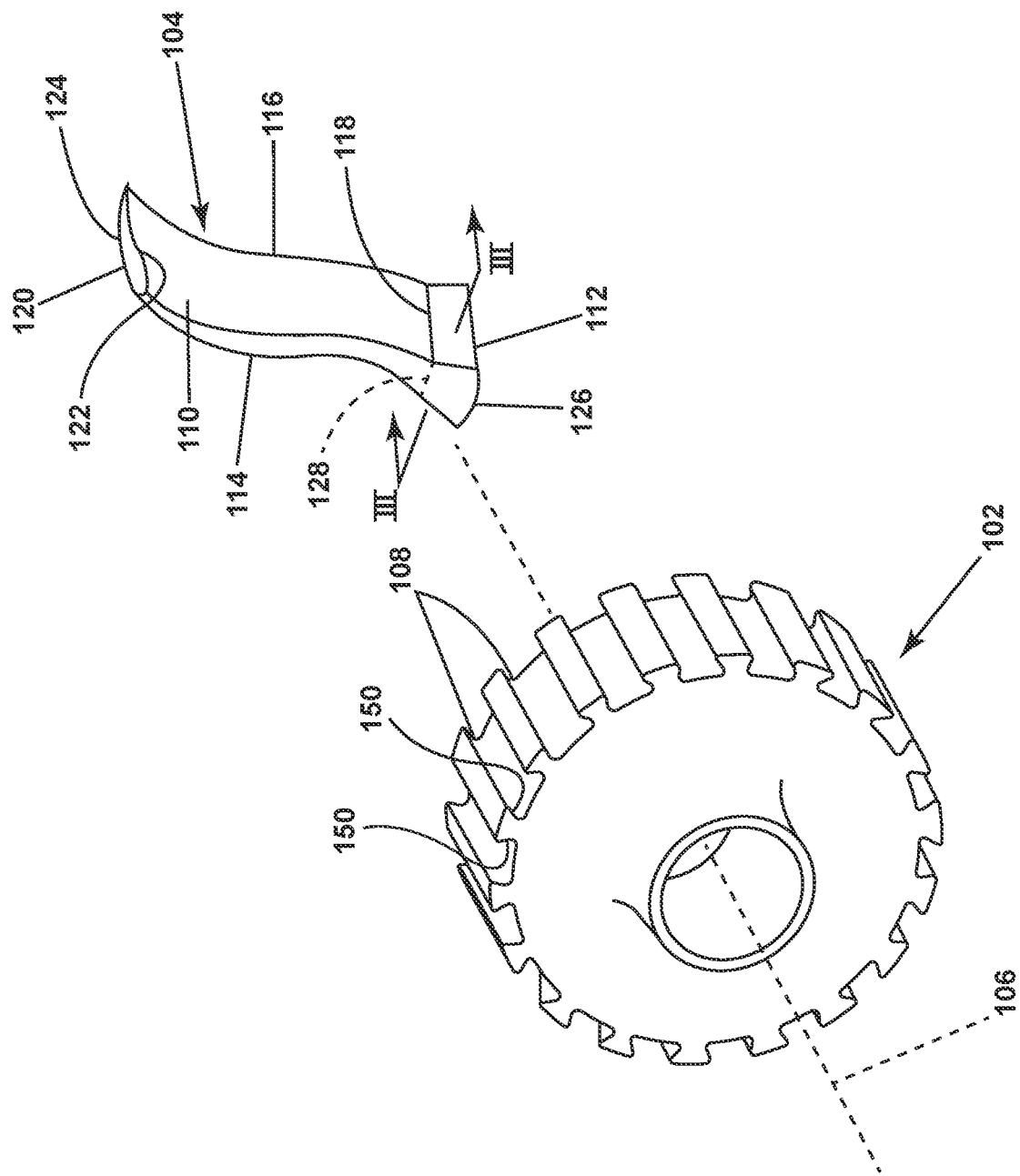
FIG. 2 is a schematic perspective view of a composite airfoil assembly and disk assembly suitable for use within the turbine engine of FIG. 1, the composite blade assembly including an airfoil and a dovetail.

FIG. 2 is a schematic perspective view of a composite airfoil assembly 104 and a disk assembly 102 suitable for use within the turbine engine 10 of FIG. 1. The disk assembly 102 is suitable for use as the disk 61, 71 (FIG. 1) or any other disk such as, but not limited to, a disk within the fan section 18, the compressor section 22, or the turbine section 32 of the turbine engine 10. The composite airfoil assembly 104 can be rotating or non-rotating such that the composite airfoil assembly 104 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 104 can be a composite fan blade assembly.

The disk assembly 102 can be rotatable or stationary about a rotational axis 106. The rotational axis 106 can coincide with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106. Each slot of the plurality of slots 108 includes two opposing walls 150 that are circumferentially spaced from one another.

The composite airfoil assembly 104 includes an airfoil portion 110 and a dovetail portion 112 extending from the airfoil portion 110. The airfoil portion 110 extends between a leading edge 114 and a trailing edge 116 to define a chord-wise direction. The airfoil portion 110 extends between a root 118 and a tip 120 to define a span-wise direction. The airfoil portion 110 includes a pressure side 122 and a suction side 124. The dovetail portion 112 extends between a first end 126 and a second end 128 in the span-wise direction. The first end 126 is radially spaced inwardly from the second end 128, with respect to the rotational axis 106. The first end 126 defines a radial inner surface of the dovetail portion 112. The second end 128 denotes a transition between the dovetail portion 112 and the airfoil portion 110. As a non-limiting example, the second end 128 coincides with the root 118 of the airfoil portion 110. The dovetail portion 112 and the airfoil portion 110 can be integrally or non-integrally formed with each other.

The composite airfoil assembly 104 is coupled to the disk assembly 102 by inserting at least a portion of the dovetail portion 112 into a respective slot of the plurality of slots 108. The composite airfoil assembly 104 is held in place by frictional contact with the slot 108 or can be coupled to the slot 108 via any suitable coupling method such as, but not limited to, welding, adhesion, fastening, or the like. While only a single composite airfoil assembly 104 is illustrated, it will be appreciated that there can be any number of one or more composite airfoils assemblies 104 coupled to the disk assembly 102. As a non-limiting example, there can be a plurality of composite airfoil assemblies 104 corresponding to a total number of slots of the plurality of slots 108.

Figure 3:
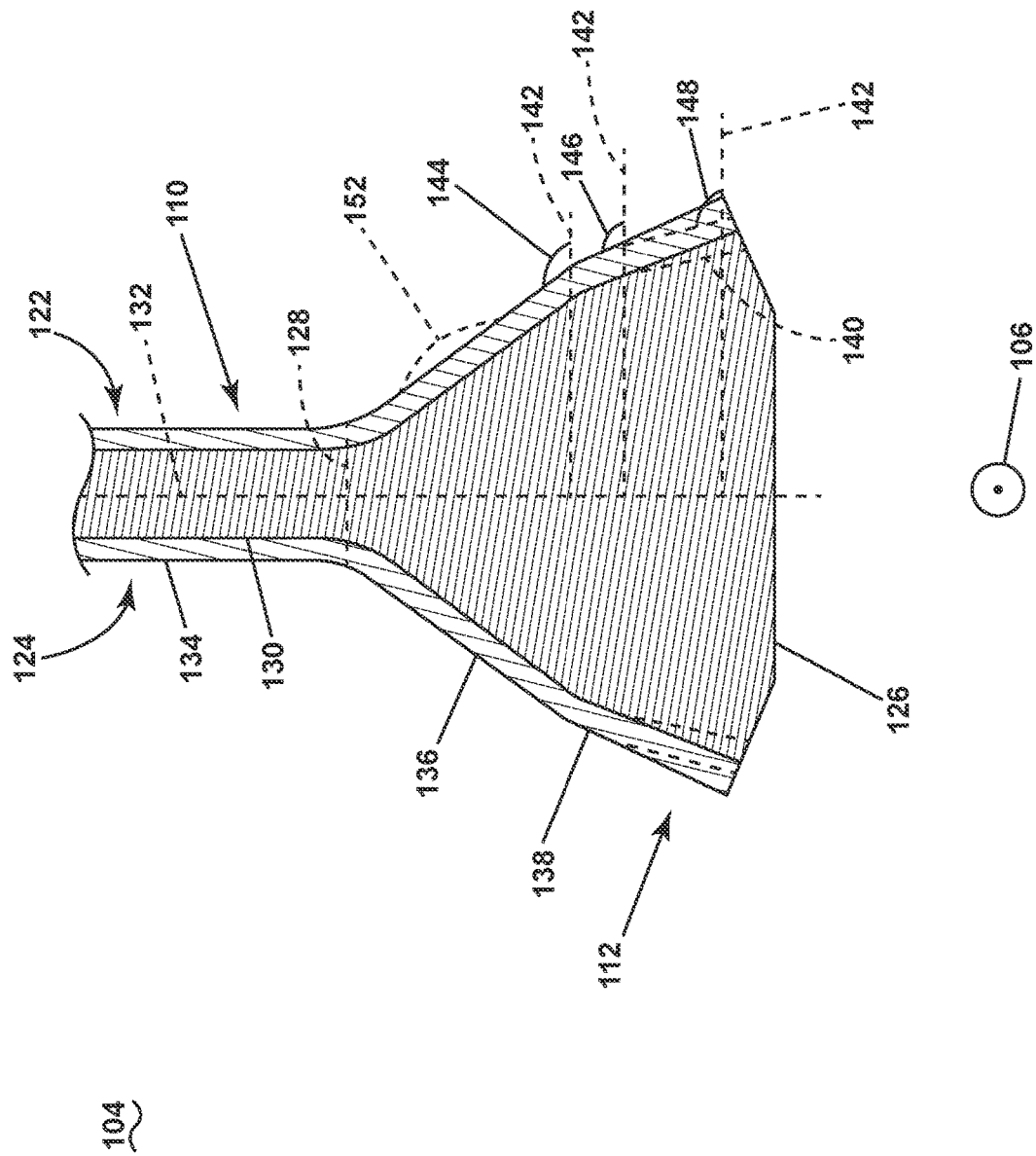
FIG. 3 is a schematic cross-sectional front view of a section of the composite airfoil assembly as seen from sectional line III-III of FIG. 2, further illustrating a laminate skin having at least a first portion and a second portion.

FIG. 3 is a schematic cross-sectional front view of a section of the composite airfoil assembly 104 as seen from sectional line III-III of FIG. 2. The composite airfoil assembly 104 extends along a centerline axis 132 extending from the first end 126 of the dovetail portion 112 to the tip 120 (FIG. 2) of the airfoil portion 110. The centerline axis 132 is equidistant from respective opposing portions of the composite airfoil assembly 104. The centerline axis 132 can be linear or non-linear. The composite airfoil assembly 104 can be symmetric or asymmetric about the centerline axis 132. The centerline axis 132 can also be a body axis, which, in the case of an asymmetrical airfoil, may not extend along the center of the body.

The composite airfoil assembly 104 includes a core 130 defining and extending between respective portions of the dovetail portion 112 and the airfoil portion 110. The core 130 can extend from the first end 126 to the tip 120 along the centerline axis 132. A laminate skin 134 overlies the core 130, and therefore, respective portions of the dovetail portion 112 and the airfoil portion 110. As used herein, a "skin" refers to a layer of material having multiple plies or layers of composite materials. The core 130, and the laminate skin 134 can each define respective portions of the first end 126 of the dovetail portion 112. The laminate skin 134 can define an outer wall of the airfoil portion 110.

As illustrated, the dovetail portion 112 includes a flared cross-sectional area that extends radially outward, with respect to the centerline axis 132, from the second end 128 to the first end 126. The laminate skin 134 follows this flared cross-sectional area of the dovetail portion 112.

The laminate skin 134 includes, at least a first portion 136 and a second portion 138 extending from the first portion 136. The first portion 136 can extend axially from the second end 128 and toward the first end 126, with respect to the centerline axis 132. The second portion 138 can extend axially from the first portion 136 and toward or to the first end 126, with respect to the centerline axis 132. The laminate skin 134 can include any number of additional portions, such as, but not limited to, a third portion 140 (illustrated in phantom lines) extending axially from the second portion 138 and towards or to the first end 126, with respect to the centerline axis 132.

It will be appreciated that the first portion 136, the second portion 138, and any other subsequent portion (e.g., the third portion 140) can be formed on a single side of the composite airfoil assembly 104 such that the laminate skin 134 is asymmetric about the centerline axis 132 or on both sides of the composite airfoil assembly 104 such that the laminate skin 134 is symmetric about the centerline axis 132. As a non-limiting example, the first portion 136, the second portion 138 and any other subsequent portion can be applied to only a side of the composite airfoil assembly 104 corresponding to the pressure side 122 of the airfoil portion 110, while the other side of the composite airfoil assembly 104 corresponding to the suction side 124 does not include the first portion 136, the second portion 138 and any subsequent portion as described herein.

In the illustrated embodiment of FIG. 3, the first portion 136 extends at a first angle 144 with respect to a horizontal plane 142 that is perpendicular to the centerline axis 132 and intersects the first portion 136. The second portion 138 extends at a second angle 146 with respect to the horizontal plane 142. In an embodiment including the third portion 140 (as shown in phantom lines in FIG. 3, the third portion 140 extends at a third angle 148 with respect to the horizontal plane 142. The first angle 144 is measured where the first portion 136 meets the second portion, the second angle 146 is measured where the second portion 138 meets the third portion 140 or the first end 126, and the third angle 148 is measured where the third portion 140 meets the first end 126 or another consecutive portion of the laminate skin 134.

The first angle 144 is greater than the second angle 146, which is greater than the third angle 148, if included. In other words, the portions of the laminate skin 134 axially closer to the first end 126 has an angle that is less than the angle of the portions of the laminate skin 134 axially farthest from the first end 126, with respect to the centerline axis 132 As a non-limiting example, the first angle 144 can be greater than 0 degrees and less than or equal to 2 degrees greater than the second angle 146. As a non-limiting example, the second angle 146 can be greater than 0 degrees and less than or equal to 2 degrees greater than the third angle 148.

While illustrated as linear portions, it will be appreciated that the first portion 136, the second portion 138 and the third portion 140 can extend linearly or non-linearly. As a non-limiting example, a notch or protrusion 152 (illustrated in phantom lines) can be formed along a portion of the first portion 136, the second portion 138, or the third portion 140. In the case where a portion of the laminate skin 134 is non-linear, a new portion is only defined when the angle is permanently increased from the second end 128 towards the first end 126. In other words, a notch can be formed within the first portion 136 defining a portion of the first portion 136 that diverges from the first angle 144, however, after the notch, the first portion 136 will go back to the first angle 144 until it ultimately changes to the second angle 146 at the second portion 138.

The sizing of at least the first angle 144 and the second angle 146 can be based on the opposing walls 150 (FIG. 2) of the slot 108 (FIG. 2). For example, the opposing walls 150 each extend at a slot angle with respect to the horizontal plane 142. It is contemplated that a last portion of the laminate skin 134 (e.g., the portion of the laminate skin 134 that terminates at the first end 126) can have a respective angle that is equal to the slot angle. This, in turn, ensures that at least a portion of the composite airfoil assembly 104 directly contacts the opposing walls 150. The remaining portions of the dovetail portion 112, however, do not directly contact the opposing walls 150 such that a circumferential gap is formed between the dovetail portion 112 and the opposing walls 150.

The core 130 and the laminate skin 134 can each include any suitable composite material as described herein. As a non-limiting example, the core 130 and the laminate skin 134 can include a PMC material. As a non-limiting example, the core 130 can include braided or woven fibers. As a non-limiting example, the laminate skin 134 can include multiple PMC plies. While described in terms of PMC plies, it will be appreciated that the composite airfoil assembly 104 can include any suitable formation and further include any suitable composite plies. Therefore, as used herein, the term "composite ply" or iterations thereof, refers to any suitable composite ply architecture and is not so limited to PMC plies.

The core 130 and the laminate skin 134 can further be defined by their material properties. As a non-limiting example, the core 130 and the laminate skin 134 can each include differing material properties. As a non-limiting example, a bulk modulus of the core 130 and a bulk modulus of the laminate skin 134 can be non-equal. As a non-limiting example, the core 130 can have a greater or less bulk modulus than the bulk modulus of the laminate skin 134.

During rotation of the disk assembly 102 (FIG. 2), and therefore during the rotation of the composite airfoil assembly 104, the composite airfoil assembly 104 rotates in a first circumferential direction, with respect to the rotational axis 106. A force, due to inertia, is applied to the composite airfoil assembly 104 that causes the composite airfoil assembly 104 to flex in a second circumferential direction, opposite the first circumferential direction. It is contemplated that the composite airfoil assembly 104 will experience higher flexing than a conventional airfoil assembly made of conventional materials (e.g., metals) as composite materials are more susceptible to bending and flexing. The bending and the flexing of the composite materials will be referred to as the compression of the composite materials. With the increased compression, with respect to the conventional airfoil assembly, higher mechanical stresses are experienced along the composite airfoil assembly 104. In order to mitigate the effects of compressing the composite materials of the composite airfoil assembly 104, the inclusion of the first angle 144, the second angle 146, and any other subsequent angle, is used to distribute the mechanical stresses along the composite airfoil assembly 104. It is contemplated that during rotation, the lowest portion (e.g., the portion nearest the first end 126) will come into contact with the slot 108 (FIG. 2) first. As the composite airfoil assembly 104 compresses, each subsequent portion will compress and flex towards and ultimately to the slot 108. This subsequent compression of each portion of the dovetail portion 112 to the slot 108 distributes the mechanical stresses along the dovetail portion 112 rather than concentrating all of the mechanical stresses at a single point. This, ultimately, ensures that the composite airfoil assembly 104 will not fail under the anticipated loads.

It is contemplated that the composite airfoil assembly 104 will experience the highest mechanical stresses on a side of the composite airfoil assembly 104 corresponding to a side opposite the direction of the rotation of the composite airfoil assembly 104. For example, the composite airfoil assembly 104 can rotate in a direction corresponding to the suction side 124 of the airfoil portion 110, in turn causing the composite airfoil assembly 104 to compress towards the pressure side 122. This, in turn, means that the highest mechanical stresses will be experienced at the transition on the pressure side 122. As such, it is contemplated that the first portion 136, the second portion 138 and any other subsequent portions can be provided at least on a single side of the composite airfoil assembly 104 that corresponds to where the expected highest mechanical stresses will be experienced.

Benefits associated with the use of a composite airfoil assembly include a lighter airfoil assembly without sacrificing performance of the airfoil assembly when compared to a non-composite (e.g., cast) airfoil assembly. In other words, the material used for the composite airfoil assembly are lighter than the materials used for the non-composite airfoil assembly and do not sacrifice the ability to perform as intended within the turbine engine. The decreased weight, in turn, means an increased efficiency of the turbine engine when compare to a conventional turbine engine including the non-composite airfoil assembly.

Further benefits associated with the composite airfoil assembly include an airfoil assembly able to withstand the mechanical stresses associated with the operation of the composite airfoil assembly when compared to a conventional composite airfoil assembly. For example, the conventional composite airfoil assemblies can include a laminate skin that follows a flared cross-sectional area of the dovetail and includes a singular angle of extension. During rotation of the conventional composite airfoil assembly, the composite material will flex and compress towards the direction of rotation. This flexing is not experienced in conventional blade assemblies including non-composite materials. This flexing of the composite materials can result in higher mechanical stresses on the materials of the conventional composite airfoil assembly. The composite airfoil assembly, as described herein, however, includes the laminate skin defined by the plural portions extending at differing angles, with the larger of the angles being axially closer to the first end of the dovetail portion. This configuration allows for the mechanical stresses to be distributed through the dovetail and the composite airfoil assembly, as described herein, thus ensuring that at least one point does not experience too high of a stress. In other words, the composite airfoil assembly is better suited to withstand the mechanical stresses associated with the operation of the composite airfoil assembly, thus resulting in a longer lifespan and efficiency of the composite airfoil assembly when compared to the conventional composite airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A composite blade assembly for a turbine engine, the composite blade assembly comprising a core defining a centerline axis, the core having a composite structure and defining a dovetail portion extending between a first end and a second end axially spaced from the first end, with respect to the centerline axis, and a blade portion extending axially from the second end and away from the dovetail portion, the blade portion having a pressure side and a suction side, and a laminate skin, having at least one composite ply, overlying the core, the laminate skin along the dovetail portion comprising a first portion forming a first angle relative to a horizontal plane extending perpendicular to the centerline axis when viewed along a vertical plane extending along the centerline axis and intersecting the laminate skin, and a second portion extending axially from the first portion and towards the first end, with respect to the centerline axis, the second portion forming a second angle relative to the horizontal plane, with the second angle less than the first angle.

A composite airfoil assembly comprising a core defining a centerline axis, the core having a composite structure and defining a dovetail portion extending between a first end and a second end axially spaced from the first end, with respect to the centerline axis, and an airfoil portion extending axially from the second end and away from the dovetail portion, the airfoil portion having a pressure side and a suction side, and a laminate skin, having at least one composite ply, overlying the core, the laminate skin along the dovetail portion comprising a first portion forming a first angle relative to a horizontal plane extending perpendicular to the centerline axis when viewed along a vertical plane extending along the centerline axis and intersecting the laminate skin, and a second portion extending axially from the first portion and towards the first end, with respect to the centerline axis, the second portion forming a second angle relative to the horizontal plane, with the second angle being less than the first angle.

The composite blade assembly of any preceding clause, wherein the laminate skin further includes a third portion extending axially from the second portion and towards the first end, the third portion extending at a third angle relative to the horizontal plane, different from at least one of the first angle or the second angle.

The composite blade assembly of any preceding clause, wherein the third angle is non-equal to both the first angle and the second angle.

The composite blade assembly of any preceding clause, wherein the third angle is less than the second angle.

The composite blade assembly of any preceding clause, wherein the composite structure of the core includes a braided or woven fabric.

The composite blade assembly of any preceding clause, wherein the core includes a material having a first bulk modulus, and the laminate skin includes a material having a second bulk modulus, different from the first bulk modulus.

The composite blade assembly of any preceding clause, wherein the first bulk modulus is greater than the second bulk modulus.

The composite blade assembly of any preceding clause, wherein the first bulk modulus is less than the second bulk modulus.

The composite blade assembly of any preceding clause, wherein the dovetail portion is asymmetric about the centerline axis.

The composite blade assembly of any preceding clause, wherein the blade portion includes a pressure side and a suction side, with the first portion and the second portion being provided on a side of the composite blade assembly corresponding to the pressure side.

The composite blade assembly of any preceding clause, wherein at least one of the first portion or the second portion extend non-linearly.

The composite blade assembly of any preceding clause, wherein a notch or a protrusion is formed along a portion of the first portion or the second portion.

The composite blade assembly of any preceding clause, wherein the turbine engine includes a fan section, a compressor section, a combustion section and a turbine section in serial flow arrangement, with the composite blade assembly being provided in the fan section.

The composite blade assembly of any preceding clause, wherein at least a portion of the core and the laminate skin each include a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix The composite blade assembly of any preceding clause, wherein the core and the laminate skin each include the polymer matrix composite.

The composite airfoil assembly of any preceding clause, wherein the laminate skin further includes a third portion extending axially from the second portion and towards the first end, the third portion extending at a third angle relative to the horizontal plane, different from at least one of the first angle or the second angle.

The composite airfoil assembly of any preceding clause, wherein the third angle is less than the second angle.

The composite airfoil assembly of nay preceding clause, wherein the dovetail portion is asymmetric about the centerline axis.

The composite airfoil assembly of any preceding clause, wherein the core includes a material having a first bulk modulus and the laminate skin includes a material having a second bulk modulus, different from the first bulk modulus.

What is claimed is:

1. A composite airfoil assembly comprising:
   a core defining a centerline axis, the core having a composite structure, the core defining:
      a dovetail portion extending axially along the centerline axis between a first end and a second end; and
      an airfoil portion extending axially along the centerline axis from the second end and axially away from the dovetail portion, with respect to the centerline axis, the airfoil portion having a pressure side and a suction side; and
   a laminate skin, having at least one composite ply, overlying the core, the laminate skin extending along the dovetail portion, the laminate skin along the dovetail portion comprising at least:
      a first portion having a first portion end defined as an axially farthest portion of the first portion from the second end, with respect to the centerline axis, the first portion forming a first angle relative to a first radial line extending radially from the centerline axis and intersecting the first portion end;
      a second portion having a second portion end defined as an axially farthest portion of the second portion from the second end, with respect to the centerline axis, the second portion end being provided along the first end of the dovetail portion, the second portion forming a second angle relative to a second radial line extending radially from the centerline axis and intersecting the second portion end, the second angle being less than the first angle and greater than 90 degrees; and
      a third portion extending axially from the first portion end and towards the second portion, the third portion having a third portion end defined as an axially farthest portion of the third portion from the second end, with respect to the centerline axis, the third portion extending at a third angle relative to a third line extending radially from the centerline axis and intersecting the second portion end, the third angle being different from at least one of the first angle or the second angle.

2. The composite airfoil assembly of claim 1, wherein the third angle is non-equal to both the first angle and the second angle.

3. The composite airfoil assembly of claim 1, wherein the composite structure of the core includes a braided or woven fabric.

4. The composite airfoil assembly of claim 1, wherein the first portion and the second portion being provided on a side of the composite airfoil assembly corresponding to the pressure side.

5. The composite airfoil assembly of claim 1, wherein at least one of the first portion or the second portion extend non-linearly.

6. The composite airfoil assembly of claim 1, wherein a notch or a protrusion is formed along a portion of the first portion or the second portion.

7. The composite airfoil assembly of claim 1, wherein the composite airfoil assembly is provided within a turbine engine having a fan section, a compressor section, a combustion section and a turbine section in serial flow arrangement, with the composite airfoil assembly being provided in the fan section.

8. The composite airfoil assembly of claim 1, wherein at least a portion of the core and the laminate skin each include a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

9. The composite airfoil assembly of claim 8, wherein the core and the laminate skin each include the polymer matrix composite.

10. The composite airfoil assembly of claim 1, wherein the third angle is greater than the second angle.

11. The composite airfoil assembly of claim 1, wherein the dovetail portion is asymmetric about the centerline axis.

12. The composite airfoil assembly of claim 1, wherein the core includes a material having a first bulk modulus and the laminate skin includes a material having a second bulk modulus, different from the first bulk modulus.

13. The composite airfoil assembly of claim 12, wherein the first bulk modulus is greater than the second bulk modulus.

14. The composite airfoil assembly of claim 12, wherein the first bulk modulus is less than the second bulk modulus.

15. The composite airfoil assembly of claim 1, wherein the composite airfoil assembly is a composite blade assembly rotatable about a rotational axis.

16. The composite airfoil assembly of claim 1, further comprising a disk assembly having a slot, the dovetail portion being receivable within the slot.

17. The composite airfoil assembly of claim 16, wherein the disk assembly is rotatable about a rotational axis.

18. The composite airfoil assembly of claim 17, wherein the disk assembly further comprises a plurality of slots circumferentially spaced along a radially outer surface of the disk assembly.

19. The composite airfoil assembly of claim 18, further comprising a plurality of airfoils received within the plurality of slots, with each airfoil of the plurality of airfoils having a respective dovetail portion.

20. The composite airfoil assembly of claim 16, wherein the slot comprises opposing side walls, with the first portion, the second portion, and the third portion being used to evenly distribute stresses along the dovetail portion when at least one of the first portion, the second portion, or the third portion contacts a respective side wall of the opposing side walls.

* * * * *